(12) United States Patent
Yerushalmi et al.

(10) Patent No.: US 9,389,673 B2
(45) Date of Patent: Jul. 12, 2016

(54) SYSTEMS AND METHODS OF PERFORMING A DATA SAVE OPERATION

(75) Inventors: Daniel Zvi Yerushalmi, Ra'anana (IL); Yaniv Iarovici, Kfar Saba (IL)

(73) Assignee: SANDISK TECHNOLOGIES INC., Plano, TX (US)

( * ) Notice: Subject to any disclaimer, the term of this patent is extended or adjusted under 35 U.S.C. 154(b) by 98 days.

(21) Appl. No.: 13/335,246

(22) Filed: Dec. 22, 2011

(65) Prior Publication Data

US 2013/0166866 A1 Jun. 27, 2013

(51) Int. Cl.
*G06F 1/32* (2006.01)
*G06F 3/06* (2006.01)

(52) U.S. Cl.
CPC ............ *G06F 1/3275* (2013.01); *G06F 1/3203* (2013.01); *G06F 1/325* (2013.01); *G06F 1/3225* (2013.01); *G06F 1/3268* (2013.01); *G06F 1/3287* (2013.01); *G06F 3/0625* (2013.01); *G06F 3/0634* (2013.01); *G06F 3/0673* (2013.01); *G06F 2212/1028* (2013.01); *Y02B 60/1228* (2013.01); *Y02B 60/32* (2013.01)

(58) Field of Classification Search
CPC ............ G06F 11/1456; G06F 11/2074; G06F 11/2071; G06F 11/1451; G06F 11/2082; G06F 1/3203; G06F 1/3221; G06F 1/3225; G06F 1/13268; G06F 1/13275
USPC .......................................... 711/162; 713/324
See application file for complete search history.

(56) References Cited

U.S. PATENT DOCUMENTS

| 5,805,910 | A  | * | 9/1998  | Lee et al. ................ 713/323 |
| 5,995,139 | A  |   | 11/1999 | Lee |
| 6,356,965 | B1 |   | 3/2002  | Broyles et al. |
| 6,462,992 | B2 |   | 10/2002 | Harari et al. |
| 6,654,895 | B1 |   | 11/2003 | Henkhaus et al. |
| 6,901,298 | B1 |   | 5/2005  | Govindaraj et al. |
| 6,961,859 | B2 |   | 11/2005 | Derocher et al. |
| 7,072,989 | B1 |   | 7/2006  | Kolokowsky et al. |
| 7,093,923 | B2 |   | 8/2006  | Silverbrook et al. |

(Continued)

FOREIGN PATENT DOCUMENTS

| EP | 2416229 A2    | 2/2012  |
| GB | 2477417 A     | 8/2011  |
| WO | 2011154776 A1 | 12/2011 |

OTHER PUBLICATIONS

The International Search Report and Written Opinion mailed Feb. 1, 2013 in International Application No. PCT/US2012/065862, 10 pages.

(Continued)

*Primary Examiner* — Charles Rones
*Assistant Examiner* — Andrew Russell
(74) *Attorney, Agent, or Firm* — Toler Law Group, PC

(57) ABSTRACT

A method includes entering a hibernation mode in a data storage device with a controller, a non-volatile memory, and a volatile memory having a first portion and a second portion. The hibernation mode is entered by copying, to the second portion, data that is in the first portion and that is flagged to remain available at the volatile memory during the hibernation mode, and powering off the first portion while maintaining power to the second portion.

26 Claims, 12 Drawing Sheets

(56) References Cited

U.S. PATENT DOCUMENTS

| | | | |
|---|---|---|---|
| 7,499,733 | B2 | 3/2009 | Burgan et al. |
| 7,505,795 | B1 | 3/2009 | Lim et al. |
| 7,757,060 | B2 | 7/2010 | Montero et al. |
| 8,117,428 | B2 | 2/2012 | Breton et al. |
| 8,230,246 | B1 | 7/2012 | Sharkey |
| 2002/0087816 | A1* | 7/2002 | Atkinson et al. ............ 711/156 |
| 2003/0051182 | A1 | 3/2003 | Tsirkel et al. |
| 2004/0032605 | A1 | 2/2004 | Regimbal |
| 2004/0225904 | A1 | 11/2004 | Perez et al. |
| 2005/0114641 | A1 | 5/2005 | O'Connor et al. |
| 2006/0080501 | A1* | 4/2006 | Auerbach et al. ............ 711/112 |
| 2006/0190750 | A1 | 8/2006 | Maggi et al. |
| 2006/0259803 | A1 | 11/2006 | Edwards et al. |
| 2007/0085677 | A1 | 4/2007 | Neff et al. |
| 2007/0288687 | A1 | 12/2007 | Panabaker |
| 2008/0008313 | A1 | 1/2008 | Fyke |
| 2008/0028243 | A1 | 1/2008 | Morisawa |
| 2008/0172518 | A1 | 7/2008 | Shmulevich et al. |
| 2008/0228997 | A1 | 9/2008 | Farhan et al. |
| 2008/0234935 | A1 | 9/2008 | Wolf et al. |
| 2009/0138738 | A1 | 5/2009 | Chen et al. |
| 2009/0292934 | A1 | 11/2009 | Esliger |
| 2009/0307511 | A1 | 12/2009 | Fiennes et al. |
| 2010/0003944 | A1 | 1/2010 | Orr et al. |
| 2010/0048256 | A1 | 2/2010 | Huppi et al. |
| 2010/0057983 | A1 | 3/2010 | Borras et al. |
| 2010/0058007 | A1* | 3/2010 | Yamauchi .................... 711/156 |
| 2010/0058018 | A1 | 3/2010 | Kund et al. |
| 2010/0058088 | A1 | 3/2010 | Busch et al. |
| 2010/0106886 | A1 | 4/2010 | Marcu et al. |
| 2010/0115309 | A1 | 5/2010 | Carvalho et al. |
| 2010/0138838 | A1 | 6/2010 | Lin et al. |
| 2010/0151919 | A1 | 6/2010 | Caskey |
| 2010/0162020 | A1 | 6/2010 | Maule et al. |
| 2010/0235504 | A1 | 9/2010 | Sengupta et al. |
| 2010/0235667 | A1 | 9/2010 | Mucignat et al. |
| 2010/0250985 | A1 | 9/2010 | Gupta |
| 2010/0262799 | A1 | 10/2010 | Lasser et al. |
| 2010/0313050 | A1 | 12/2010 | Harrat et al. |
| 2011/0185208 | A1 | 7/2011 | Iwamoto et al. |
| 2011/0231595 | A1* | 9/2011 | Wakrat et al. ................ 711/103 |
| 2011/0302538 | A1 | 12/2011 | Vennelakanti et al. |
| 2012/0036381 | A1* | 2/2012 | Masuda ........................ 713/323 |
| 2012/0169608 | A1 | 7/2012 | Forutanpour et al. |
| 2012/0221875 | A1 | 8/2012 | Bak et al. |
| 2012/0254631 | A1 | 10/2012 | Skillman et al. |
| 2013/0166864 | A1 | 6/2013 | Yerushalmi et al. |
| 2013/0166866 | A1 | 6/2013 | Yerushalmi et al. |

OTHER PUBLICATIONS

U.S. Appl. No. 13/335,180, filed Dec. 22, 2011, 34 pages.
U.S. Appl. No. 13/335,288, filed Dec. 22, 2011, 54 pages.
U.S. Appl. No. 13/335,332, filed Dec. 22, 2011, 68 pages.
The International Search Report and Written Opinion mailed Feb. 1, 2013 in International Application No. PCT/US2012/065875, 9 pages.
The International Search Report and Written Opinion mailed Apr. 29, 2013 in International Application No. PCT/US2012/065868, 13 pages.
The International Search Report and Written Opinion mailed May 7, 2013 in International Application No. PCT/US2012/065881, 12 pages.
Non-Final Office Action mailed Sep. 3, 2013 in U.S. Appl. No. 13/335,180, 21 pages.
Notice of Allowance and Fee(s) Due mailed Sep. 6, 2013 in U.S. Appl. No. 13/335,288, 11 pages.
Non-Final Office Action mailed Nov. 12, 2013 in U.S. Appl. No. 13/335,332, 16 pages.
Notice of Allowance and Fee(s) Due mailed Dec. 16, 2013 in U.S. Appl. No. 13/335,288, 10 pages.
Final Office Action mailed Jan. 28, 2014 in U.S. Appl. No. 13/335,180, 26 pages.
Notice of Allowance and Fee(s) Due mailed Mar. 4, 2014 in U.S. Appl. No. 13/335,288, 8 pages.
Final Office Action mailed Mar. 7, 2014 in U.S. Appl. No. 13/335,332, 17 pages.
Non-Final Office Action mailed Sep. 18, 2014 in U.S. Appl. No. 13/335,332, 15 pages.
Non-Final Office Action mailed Sep. 16, 2014 in U.S. Appl. No. 13/335,180, 23 pages.
International Preliminary Report on Patentability for International Application No. PCT/US2012/065875, issued Jun. 24, 2014, 5 pages.
International Preliminary Report on Patentability for International Application No. PCT/US2012/065862 issued Jun. 24, 2014, 6 pages.
International Preliminary Report on Patentability for International Application No. PCT/US2012/065868, issued Jun. 24, 2014, 8 pages.
International Preliminary Report on Patentability for International Application No. PCT/US2012/065881, issued Jun. 24, 2014, 8 pages.
Notice of Allowance and Fee(s) Due mailed Jun. 13, 2014 in U.S. Appl. No. 13/335,288, 8 pages.
Notice of Allowance and Fee(s) Due mailed Feb. 17, 2015 in U.S. Appl. No. 13/335,332, 5 pages.
Notice of Allowance and Fee(s) Due mailed Mar. 23, 2015 in U.S. Appl. No. 13/335,180, 9 pages.

* cited by examiner

US 9,389,673 B2

SYSTEMS AND METHODS OF PERFORMING A DATA SAVE OPERATION

FIELD OF THE DISCLOSURE

The present disclosure is generally related to performing a data save operation.

BACKGROUND

Use of mobile devices, such as portable wireless telephones, personal digital assistants (PDAs), and paging devices that are small, lightweight, and easily carried by users is widespread. However, power consumption of such mobile devices can quickly deplete a battery within the device. Many devices include one or more components that can enter a low-power mode when not in use. However, system memory includes information that is typically needed by the mobile device and that is lost when the memory loses power.

SUMMARY

Power savings may be achieved by a data storage device that is configured to enter a hibernation mode (e.g., by shutting off power to at least a portion of a volatile memory in the data storage device). For example, power savings may be achieved by a data storage device that is configured to enter the hibernation mode by copying data that is in a first portion of the volatile memory and that is flagged to remain available at the volatile memory to a second portion of the volatile memory and powering off the first portion. The second portion of the volatile memory maintains power during the hibernation mode.

DETAILED DESCRIPTION

A data storage device performs a data save operation that copies data from a volatile memory in the data storage device to a non-volatile memory in the data storage device in response to determining, based on an indication from a host device, that the data storage device is to enter a low-power state (e.g., hibernation). Copying the data from the volatile memory to the non-volatile memory prevents loss of the data upon interruption of power to the volatile memory.

Systems and methods of performing a data save operation are disclosed. The data save operation copies data from a volatile memory of the data storage device to a non-volatile memory of the data storage device in response to an indication from a host device that the data storage device is to enter a low-power state. Copying the data to the non-volatile memory prevents loss of the data upon interruption of power to the volatile memory.

Figure 1:
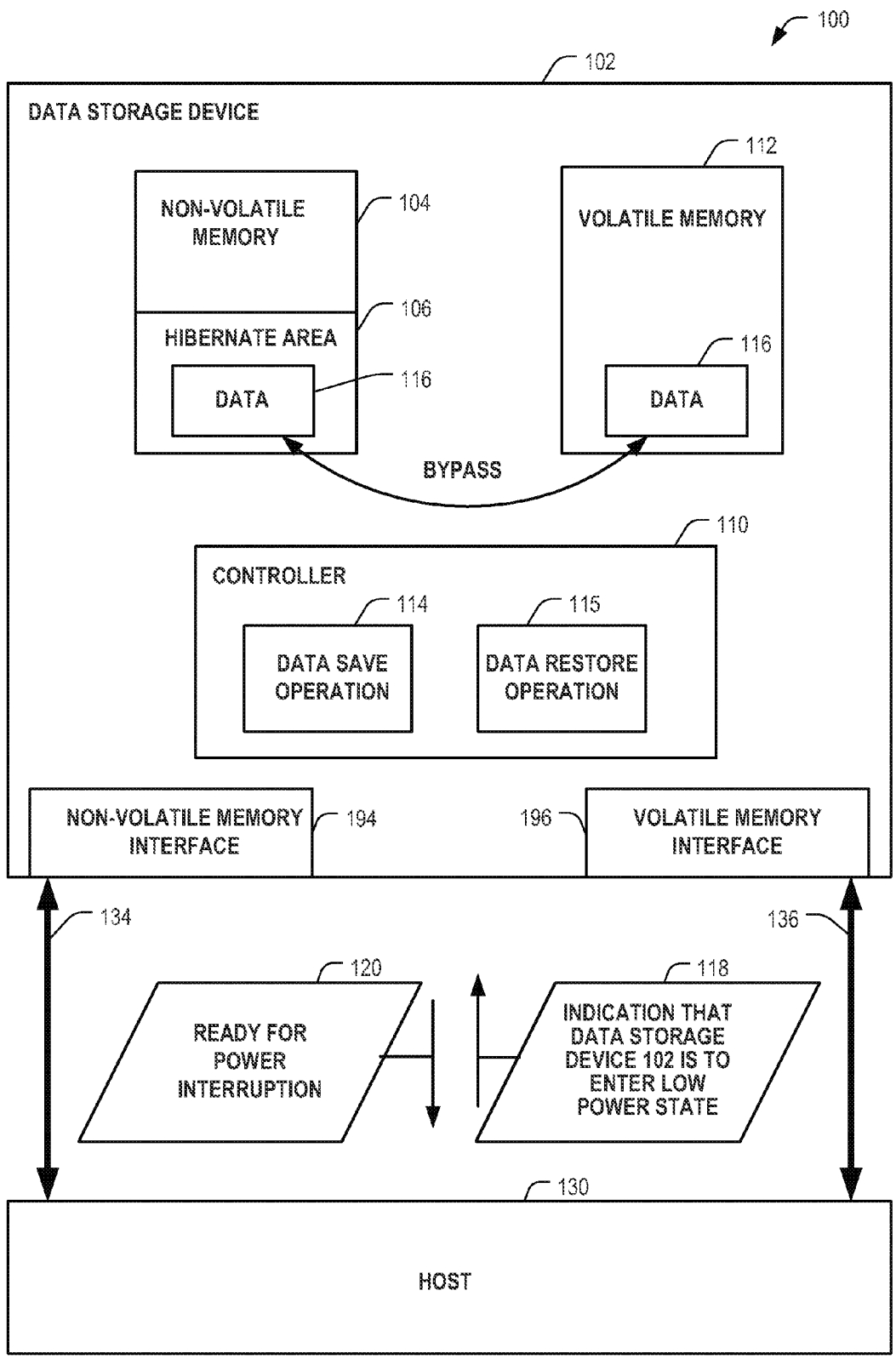
FIG. 1 is a block diagram of a first illustrative embodiment of a system to perform a data save operation that copies data from a volatile memory to a non-volatile memory.

Referring to FIG. 1, a particular illustrative embodiment of a system to perform a data save operation that copies data from a volatile memory to a non-volatile memory is depicted and generally designated 100. The system 100 includes a data storage device 102 coupled to a host device 130. The data storage device 102 includes a volatile memory 112 and a non-volatile memory 104 coupled to a controller 110. The volatile memory 112 may be a random access memory (RAM).

The host device 130 may be configured to provide data to be stored at the volatile memory 112 or at the non-volatile memory 104 or to request data to be read from the volatile memory 112 or from the non-volatile memory 104. For example, the host device 130 may include a mobile telephone, a music or video player, a gaming console, an electronic book reader, a personal digital assistant (PDA), a computer, such as a laptop computer, a notebook computer, or a tablet, any other electronic device, or any combination thereof.

The data storage device 102 is a multi chip package (MCP) device. The MCP device includes a non-volatile memory interface 194 to enable access to the non-volatile memory 104 by the host device 130 and a volatile memory interface 196 to enable access to the volatile memory 112 by the host device 130. The data storage device 102 is coupled to the host device 130 via a non-volatile memory bus 134 and a random access memory bus 136. The non-volatile memory bus 134 is coupled to the non-volatile memory interface 194 and the random access memory bus 136 is coupled to the volatile memory interface 196. The data storage device 102 may provide non-volatile storage and volatile storage to the host device 130 via the non-volatile memory bus 134 and the random access memory bus 136, respectively.

The non-volatile memory 104 may be a non-volatile memory of a flash device, such as a NAND flash device, a NOR flash device, or any other type of flash device. The non-volatile memory 104 includes a hibernate area 106. The hibernate area 106 may be a physical partition in the non-volatile memory 104, a dedicated range of storage blocks in the non-volatile memory 104, or a separate storage device, as illustrative examples. The hibernate area 106 may be configured to store data 116 that has been copied from the volatile memory 112 to the hibernate area 106 of the non-volatile memory 104.

The controller 110 controls operations of the non-volatile memory 104 and the volatile memory 112. For example, the controller 110 may include a flash controller or may be coupled to a separate flash controller. The controller 110 may be configured, upon receiving an instruction from the host device 130, to instruct the volatile memory 112 or the non-volatile memory 104 to store data or to instruct the volatile memory 112 or the non-volatile memory 104 to read data.

The controller 110 may be configured to enter a hibernation or other low-power state, upon receiving an instruction from the host device 130. For example, the controller 110 may be configured to determine, based on an indication 118 received from the host device 130, that the data storage device 102 is to enter a low-power state. The controller 110 may receive a power event signal from the host device 130 indicating a sleep state or a power off state, as described with respect to FIG. 4. As another example, the controller 110 may receive a hibernation instruction from the host device 130 indicating a hibernation state, as described with respect to FIG. 5, or may detect a period of inactivity, as described with respect to FIG. 6. Alternatively, the controller 110 may be configured to enter a hibernation or other low-power state independent of any instructions from the host device 130.

In response to determining that the data storage device 102 is to enter the low-power state, the controller 110 may perform a data save operation 114 that bypasses the non-volatile memory interface 194 and the volatile memory interface 196 and that copies the data 116 from the volatile memory 112 to the hibernate area 106 of the non-volatile memory 104. Copying the data 116 from the volatile memory 112 to the hibernate area 106 of the non-volatile memory 104 prevents loss of the data 116 upon interruption of power to the volatile memory 112. To illustrate, the data save operation 114 may include copying the data 116 from the volatile memory 112 to the controller 110, and writing the data 116 from the controller 110 to the hibernate area 106 of the non-volatile memory 104 via the bus 150. Upon completion of the data save operation 114, an indication 120 may be sent to the host device 130 that the data storage device 102 is prepared for interruption of power supplied by the host device 130.

During operation, while the data storage device 102 is operatively coupled to the host device 130, the host device 130 may send read requests and/or write requests to access the non-volatile memory 104 and to access the volatile memory 112. The controller 110 is configured to process the read requests and the write requests.

The host device 130 may send the indication 118 that the data storage device 102 is to enter the low-power state. In response to determining, based on the indication 118, that the data storage device 102 is to enter the low-power state, the controller 110 may perform the data save operation 114 that bypasses the non-volatile memory interface 194 and the volatile memory interface 196 and copies the data 116 from the volatile memory 112 to the non-volatile memory 104. For example, the data 116 may be copied from the volatile memory 112 to the hibernate area 106 of the non-volatile memory 104 via a dedicated bus, such as described with respect to FIG. 3, or via multiple internal buses, such as described with respect to FIG. 2. Upon completion of the data save operation 114, the controller 110 may send the indication 120 to the host device 130 indicating that the data storage device 102 is prepared for interruption of power supplied by the host device 130. Alternatively, or in addition, the controller 110 may be configured, upon completion of the data save operation 114, to power off the volatile memory 112 while maintaining power to the controller 110, such as described with respect to FIG. 7. Upon completion of the data save operation 114, the controller 110 may cause the data storage device 102 to enter the low-power state.

After the data storage device 102 enters the low-power state, the controller 110 may be configured to cause the data storage device 102 to exit the low-power state. For example, the controller 110 may be configured to perform a data restore operation 115. The data restore operation 115 may include copying stored data from the non-volatile memory 104 to the volatile memory 112 to restore a memory image of the volatile memory 112. The stored data may be copied from the non-volatile memory 104 to the controller 110 and then from the controller 110 to the volatile memory 112, as described in further detail with respect to FIG. 2. Alternatively, the stored data may be copied from the non-volatile memory 104 to the volatile memory 112 via a hibernation bus, as described in further detail with respect to FIG. 3.

In implementations where the volatile memory 112 is powered off while the controller 110 remains operational, powering off the volatile memory 112 reduces overall power consumption of the data storage device 102. Performing the data save operation 114 enables the data storage device 102, upon power up, to more quickly revert to a state that the data storage device 102 was in prior to entering the low-power state because the data 116 copied from the volatile memory 112 to the non-volatile memory 104 may be readily available to the host device 130 upon power up and without requiring participation of the host device in the data storage and the data retrieval related to the data save operation 114.

Figure 2:
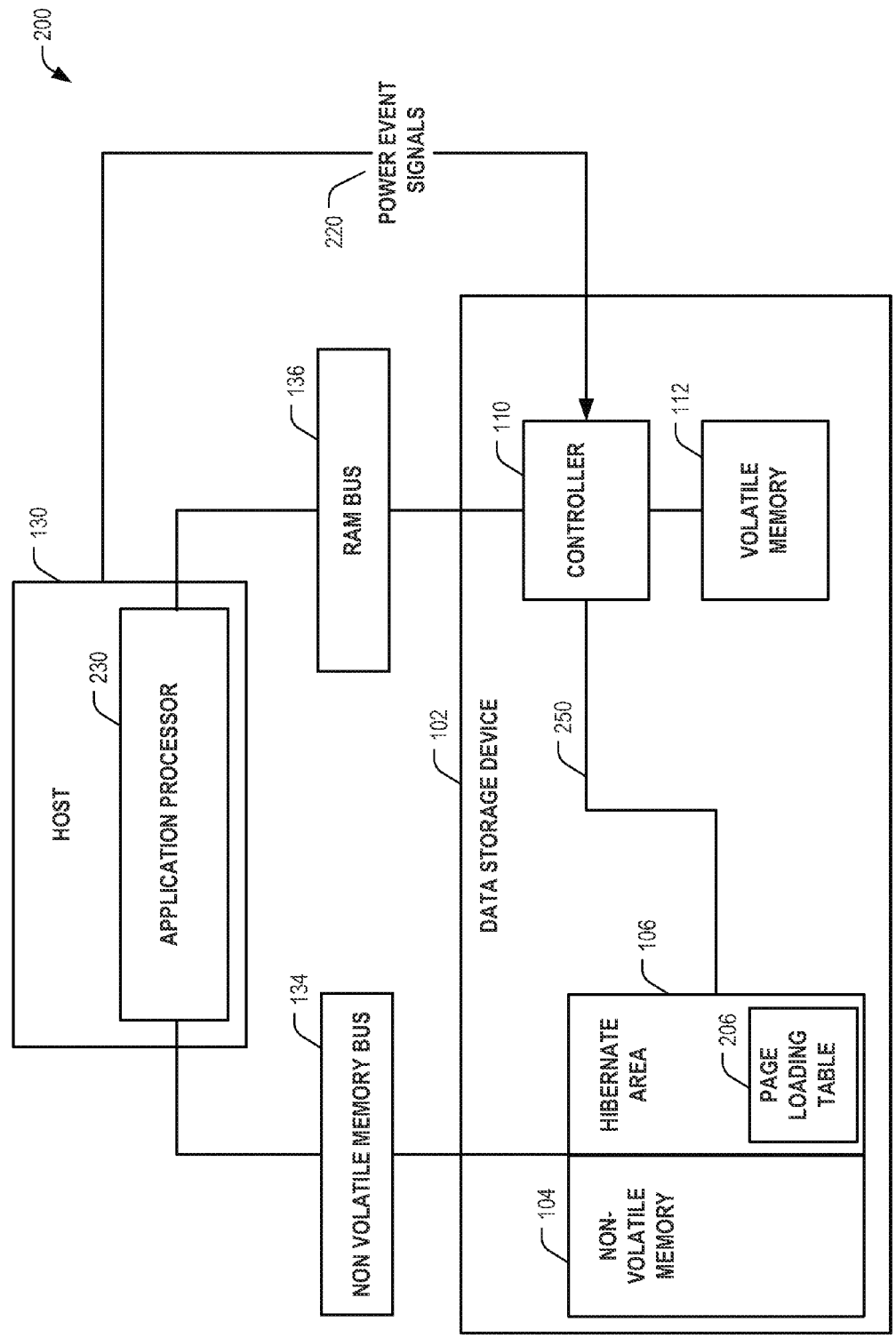
FIG. 2 is diagram of a second illustrative embodiment of the system of FIG. 1.

Referring to FIG. 2, a second illustrative embodiment of the system of FIG. 1 is depicted and generally designated 200. The system 200 includes the data storage device 102 coupled to the host device 130. The data storage device 102 includes the non-volatile memory 104, the hibernate area 106, the controller 110, and the volatile memory 112.

The host device 130 includes an application processor 230 coupled to the non-volatile memory (NVM) bus 134. The application processor 230 is also coupled to the random access memory (RAM) bus 136. The host device 130 may be coupled to the data storage device 102 via the NVM bus 134 and the RAM bus 136. The application processor 230 may communicate with the non-volatile memory 104 via the NVM bus 134. The application processor 230 may communicate with the volatile memory 112 via the RAM bus 136 and the controller 110.

The controller 110 may provide an interface between the RAM bus 136 and the volatile memory 112. The controller 110 may translate addressing from the application processor 230 to RAM addressing. The controller 110 may also be configured to receive power event signals 220 from the host device 130. The power event signals 220 may include one or more hardware signals indicating a sleep state of the data storage device 102 or a power off state of the data storage device 102. The controller 110 may be configured to detect receipt of the power event signals 220 from the host device 130 and, based on the power event signals 220, determine that the data storage device 102 is to enter a low-power (e.g., sleep or power off) state. In response to determining that the data storage device 102 is to enter the low-power state, the controller 110 may perform the data save operation 114 of FIG. 1. The controller 110 may be configured to initiate data transfer between the volatile memory 112 and the non-volatile memory 104 by passing data from the volatile memory 112 through the controller 110 to the hibernate area 106 of the non-volatile memory 104. To illustrate, the controller 110 may be configured to initiate a read operation to read data from the volatile memory 112, to encode the read data for storage at the hibernate area 106 (e.g., error correction coding (ECC) encoding), and to write the encoded data to the hibernate area 106 of the non-volatile memory 104 via the bus 150.

During operation, while the data storage device 102 is operatively coupled to the host device 130, the host device 130 may send the power event signals 220 indicating that the data storage device 102 is to enter the low-power state (e.g., indicating a sleep state of the data storage device 102 or a power off state of the data storage device 102). In response to determining, based on the power event signals 220, that the data storage device 102 is to enter the low-power state, the controller 110 may perform the data save operation 114 that copies the data 116 from the volatile memory 112 to the non-volatile memory 104.

The controller 110 may be configured to access a page loading table 206 that is stored in the hibernate area 106 and to use the page loading table 206 to determine an order of data retrieval upon exiting the low-power state. For example, the page loading table 206 may indicate a loading order of memory pages to be copied from a volatile memory image stored in the hibernate area 106 to the volatile memory 112. The controller 110 may incorporate or use a memory management unit to determine the loading order and may maintain the indication of the loading order in the page loading table 206.

In implementations where the volatile memory 112 is powered off while the controller 110 remains operational, powering off the volatile memory 112 reduces overall power consumption of the data storage device 102. Performing the data save operation 114 enables the data storage device 102, upon power up, to more quickly revert to a state that the data storage device 102 was in prior to entering the low-power state. The data 116 copied from the volatile memory 112 to the non-volatile memory 104 may be readily available to the application processor 230 upon power up and without requiring participation of the application processor 230 in the data storage and the data retrieval.

Figure 3:
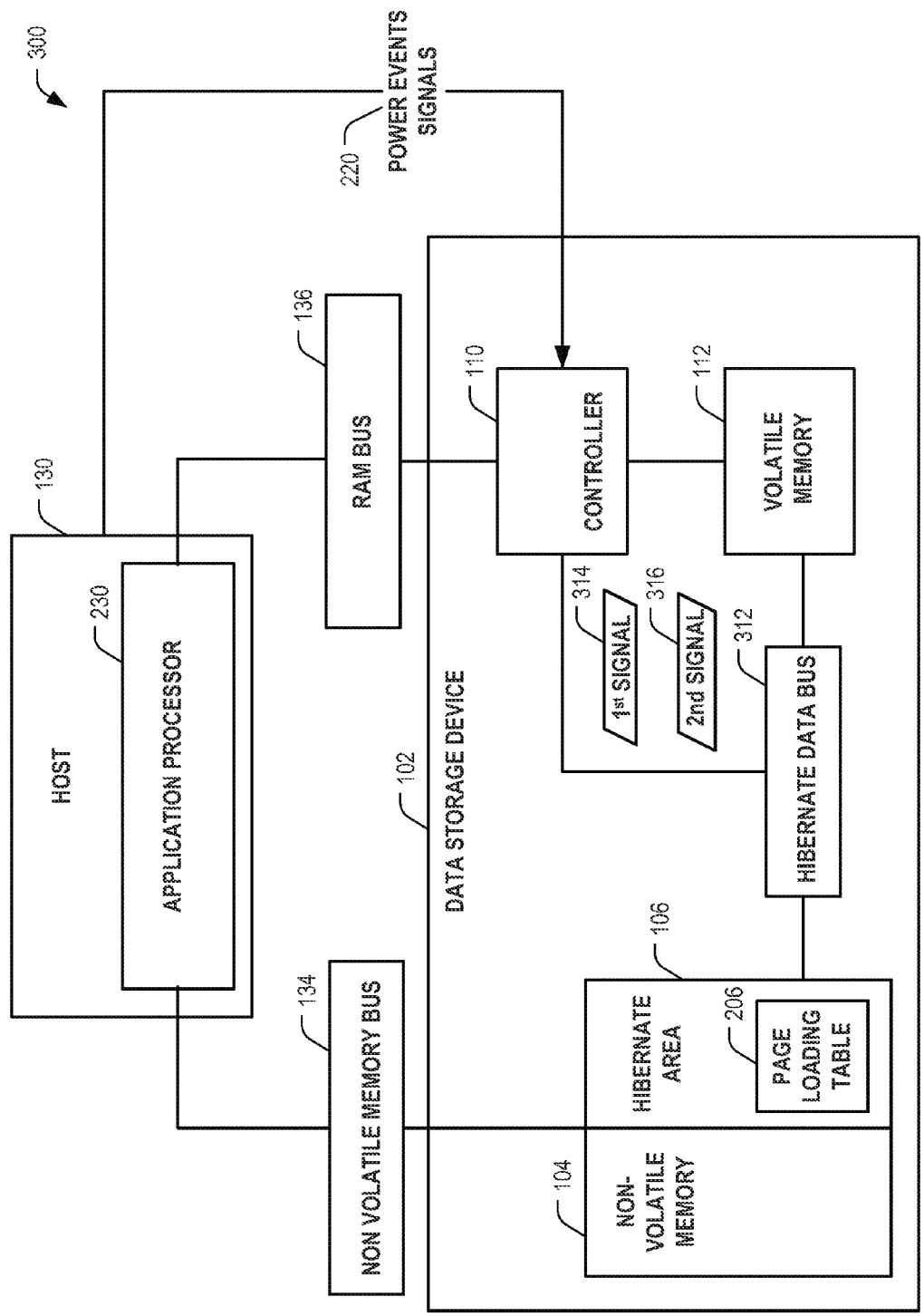
FIG. 3 is a diagram of a third illustrative embodiment of the system of FIG. 1.

Referring to FIG. 3, a third illustrative embodiment of the system of FIG. 1 is depicted and generally designated 300. The system 300 includes the data storage device 102 coupled to the host device 130. The host device 130 includes the application processor 230 coupled to the non-volatile memory bus 134 and coupled to the RAM bus 136. The data storage device 102 includes the controller 110, the non-volatile memory 104, the hibernate area 106, the page loading table 206, and the volatile memory 112. The data storage device 102 includes a hibernate data bus 312 to enable data transfer between the non-volatile memory 104 and the volatile memory 112 to bypass the controller 110.

The controller 110 is coupled to the hibernate data bus 312, and the hibernate data bus 312 connects the non-volatile memory 104 and the volatile memory 112. The controller 110 may be configured to detect receipt of the power event signals 220 from the host device 130 and to determine, based on the power event signals 220, that the data storage device 102 is to enter the low-power state. The controller 110 may be configured to perform the data save operation by generating a first bus control signal 314 (e.g., a signal, a command, etc.) to cause the hibernate data bus 312 to access data from the volatile memory 112 and to generate a second bus control signal 316 (e.g., a signal, a command, etc.) to cause the hibernate data bus 312 to send the data to the hibernate area 106 of the non-volatile memory 104. The page loading table 206 may be accessed by the controller 110 and used to determine a loading order of memory pages from a volatile memory image stored in the hibernate area 106 to the volatile memory 112 upon wakeup from the low-power state.

Using the hibernate data bus 312 may be faster for the data save operation or the data restore operation as compared to FIG. 2. For example, the controller 110 may be coupled to the non-volatile memory 104 via a bus and to the volatile memory 112 via another bus, such as illustrated in FIG. 2. Data transfer between the non-volatile memory 104 and the controller 110 and between the controller 110 and the volatile memory 112, as described with respect to FIG. 2, may introduce additional latency as compared to data transfer between the non-volatile memory 104 and the volatile memory 112 via the hibernate data bus 312. As a result, entering the low-power state and/or exiting the low-power state may be performed more quickly as compared to the system of FIG. 2.

Figure 4:
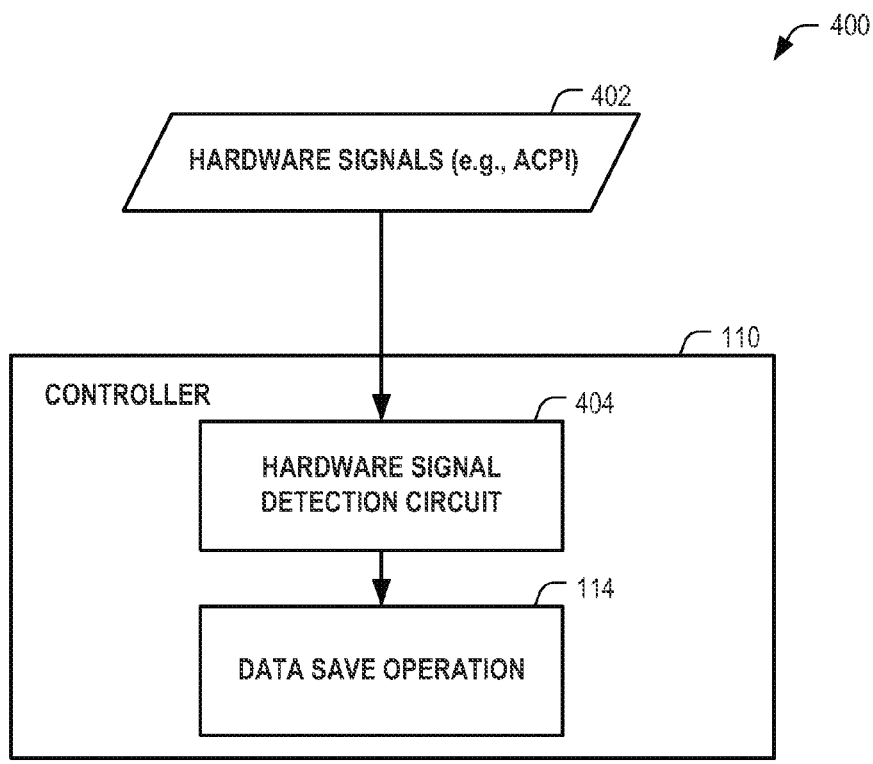
FIG. 4 is a block diagram that illustrates a particular embodiment of receipt of hardware signals that indicate that a data storage device is to enter a low-power state.
Figure 5:
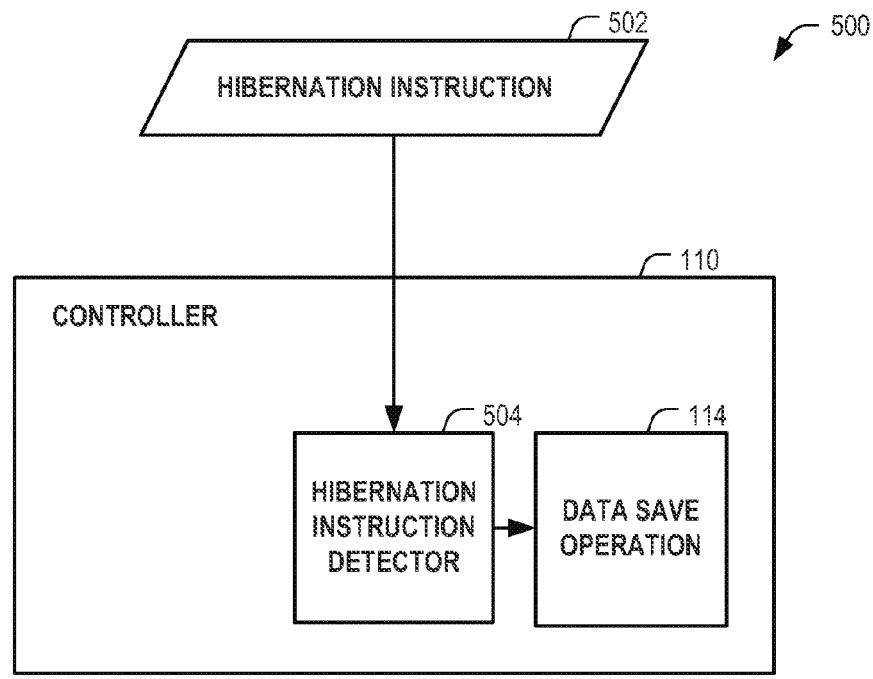
FIG. 5 is a block diagram that illustrates a particular embodiment of receipt of a hibernation instruction that indicates that a data storage device is to enter a low-power state.
Figure 6:
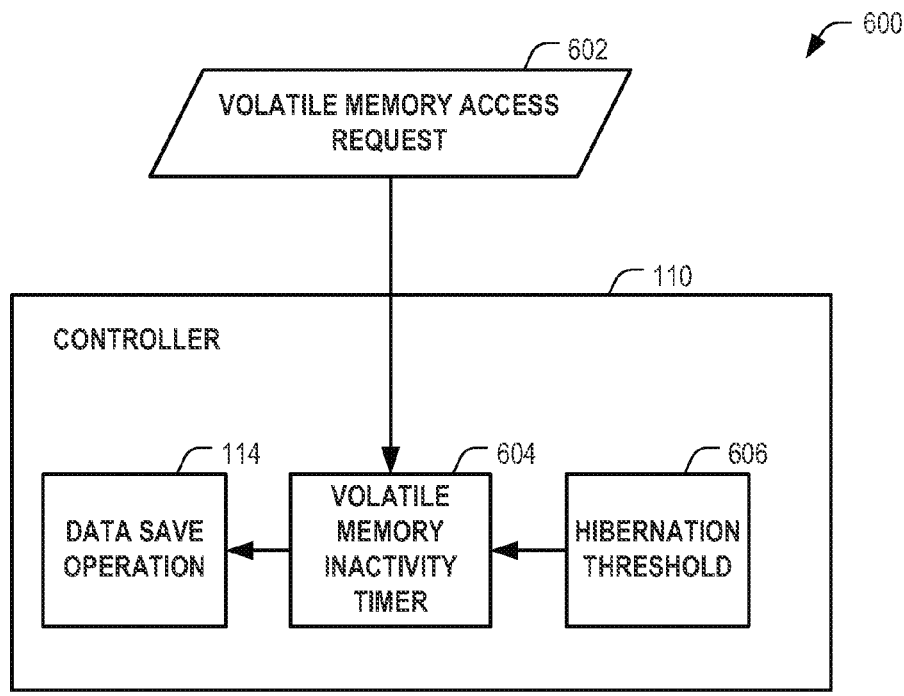
FIG. 6 is a block diagram that illustrates a particular embodiment of receipt of a timer value exceeding a hibernation threshold to indicate that a data storage device is to enter a low-power state, where the timer value indicates an elapsed time since receipt of a request from the host device to access the volatile memory.

FIGS. 4-6 are examples of different indications that may be sent from a host device to a data storage device to indicate that the data storage device is to enter a low-power state, such as the indication 118 sent by the host device 130 of FIG. 1 to the controller 106 to indicate that the data storage device 102 of FIG. 1 is to enter the low-power state. For example, referring to FIG. 4, a diagram 400 illustrates receipt of hardware signals 402. The diagram 400 includes the controller 110 configured to receive the hardware signals 402 from the host device 130 at a hardware signal detection circuit 404. The hardware signals 402 may indicate a sleep state or a power off state. For example, the hardware signals 402 may be compatible with the advanced configuration and power interface (ACPI) specification for device configuration and power management, such as the Advanced Configuration and Power Interface Specification, Revision 5.0, released Nov. 23, 2011.

The controller 110 may be configured to, in response to determining that the data storage device 102 is to enter the low-power state in response to receiving the hardware signals 402, perform the data save operation 114 that copies data from the volatile memory 112 to the non-volatile memory 104. After the data save operation 114 has completed, the data storage device 102 may enter a hibernation state. For example, the data storage device 102 may enter the hibernation state automatically after completing the data save operation 114.

As another example, the hardware signals 402 may cause the data storage device 102 to enter the hibernation state. For example, the hardware signals 402 may indicate a sleep state, where the sleep state includes the hibernation state. The hardware signal detection circuit 404 may detect the hardware signals 402, may cause the data save operation 114 to be performed, and may cause the controller 110 to instruct the data storage device 102 to enter the hibernation state after the data save operation 114 has completed.

Referring to FIG. 5, a diagram 500 illustrates receipt of a hibernation instruction 502 from the application processor 230 of the host device 130 at a hibernation instruction detector 504 of the controller 110 of FIG. 1, FIG. 2, or FIG. 3. The hibernation instruction 502 may indicate the hibernation state.

The controller 110 may be configured to, in response to determining that the data storage device 102 is to enter the low-power state in response to receiving the hibernation instruction 502, perform the data save operation 114 that copies data from the volatile memory 112 to the non-volatile memory 104. After the data save operation 114 has completed, the data storage device 102 may enter the hibernation state. For example, the hibernation instruction detector 504 may detect the hibernation instruction 502, may cause the data save operation 114 to be performed, and may cause the controller 110 to instruct the data storage device 102 to enter the hibernation state after the data save operation 114 has completed.

Referring to FIG. 6, a diagram 600 illustrates receipt of a request to access the volatile memory 112, such as a volatile memory access request 602. The controller 110 may be configured to determine that the data storage device 102 is to enter a low-power state by determining that an elapsed time since receipt of a most recent volatile memory access request 602 from the host device 130 to access the volatile memory 112 has exceeded a threshold.

For example, a volatile memory inactivity timer 604 may be a running timer that is reset each time a volatile memory access request 602 is received. A value of the volatile memory inactivity timer 604 may be compared to a threshold, such as a hibernation threshold 606. Based on the comparison between the inactivity timer 604 and the hibernation threshold 606, the data save operation 114 may be executed. For example, if the value of the volatile memory inactivity timer 604 exceeds the hibernation threshold 606 (e.g., the elapsed time since receipt of the volatile memory access request 602 to access the volatile memory 112 has exceeded an inactivity limit), the data save operation 114 may be executed.

After the data save operation 114 has completed, the data storage device 102 may enter the hibernation state. For example, the data storage device 102 may enter the hibernation state automatically after the data save operation 114 has completed and without instruction or intervention from the host device 130. As a result of autonomously entering the hibernation state, a power saving benefit may be provided to host devices that may not support hibernation. In addition, by performing the data save operation 114 without intervention from an application processor of the host device, a processing load of the application processor of the host device is reduced as compared to an implementation where the host device directs the data transfer from volatile memory to non-volatile memory.

Figure 7:
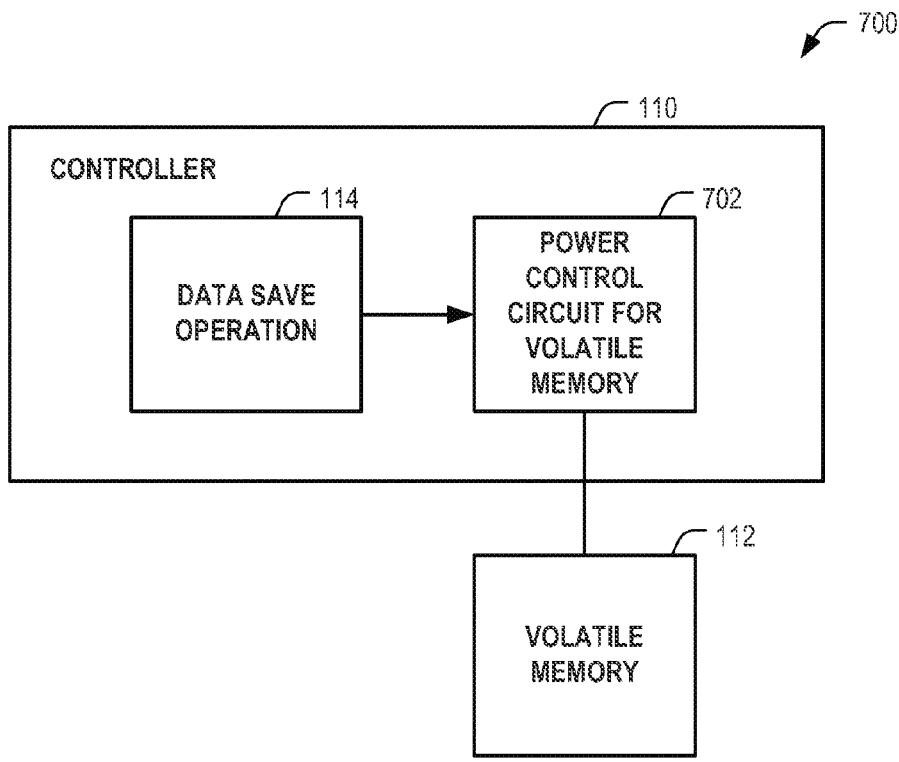
FIG. 7 is a block diagram that illustrates a particular embodiment of powering off the volatile memory of a data storage device.

Referring to FIG. 7, a diagram 700 illustrates an embodiment of the controller 110 of FIGS. 1-3 configured to power off the volatile memory 112. The controller 110 may be configured to execute the data save operation 114. The controller 110 may be configured, upon completion of the data save operation 114, to power off the volatile memory 112 while maintaining power to the controller 110. For example, a power control circuit 702 for the volatile memory may be configured to detect that the data save operation 114 has completed. To illustrate, the power control circuit 702 for the volatile memory may include an input coupled to receive a result value that is generated by the data save operation 114. Upon detecting completion of the data save operation 114, the power control circuit 702 for the volatile memory may cause the controller 110 to interrupt a power supply to the volatile memory 112. As a result, the controller 110 may power off the volatile memory 112 while maintaining power to the controller 110.

Figure 8:
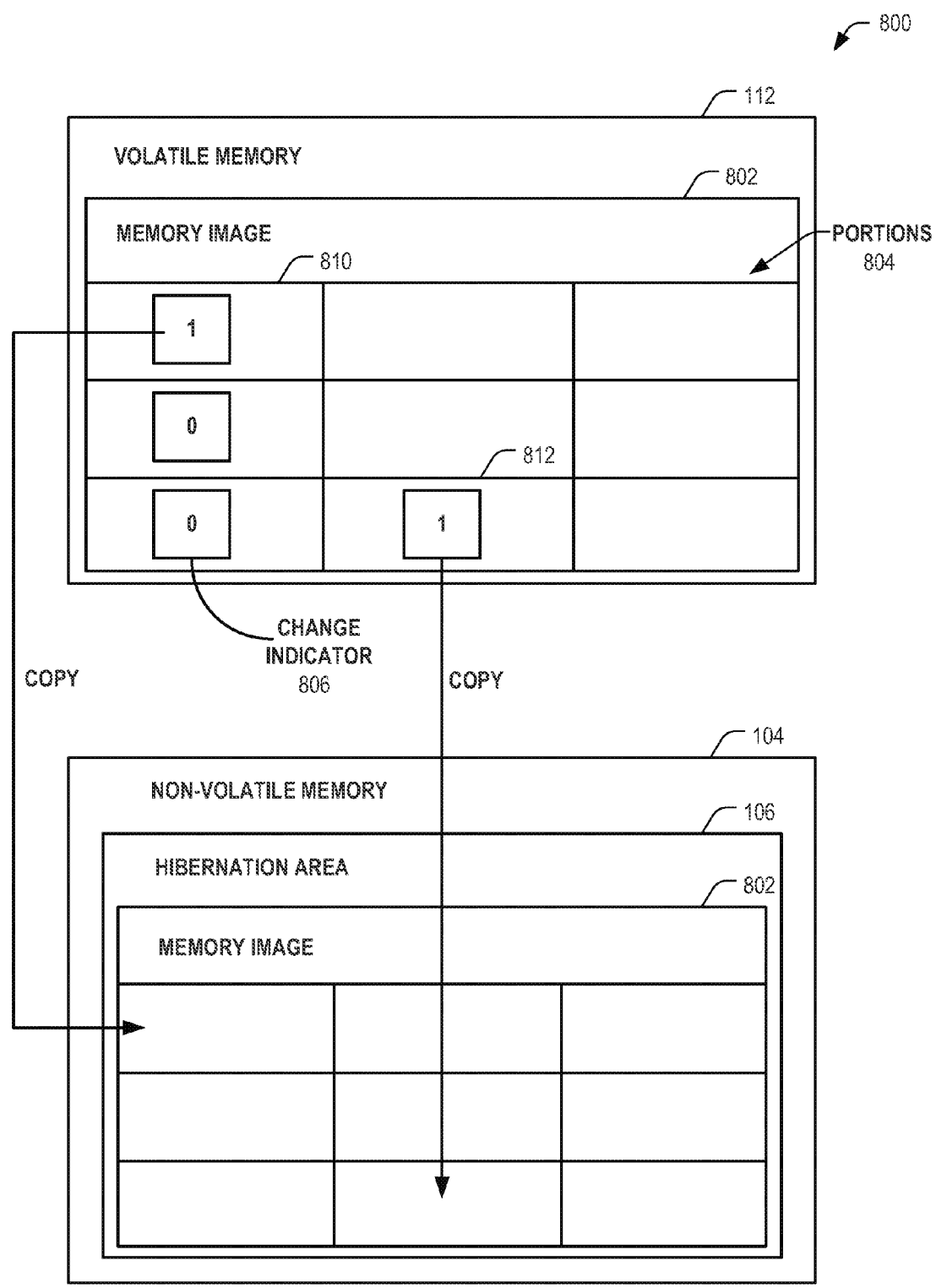
FIG. 8 is a block diagram that illustrates a particular embodiment of a data save operation that copies data from the volatile memory to a non-volatile memory of a data storage device.

Referring to FIG. 8, a diagram 800 illustrates a data save operation that copies data from the volatile memory 112 to the non-volatile memory 104. The volatile memory 112 includes a memory image 802 including multiple memory portions 804, such as representative memory portions 810 and 812. The memory image 802 may include a copy of data in at least a portion of the volatile memory 112. Each particular memory portion of the multiple memory portions 804 may have a change indicator 806 that indicates whether the particular memory portion has been modified since a most recent data restore operation. For example, the data save operation 114 may cause the memory image 802 of the volatile memory 112 to be stored in the non-volatile memory 104. However, if a portion of the memory image 802 has not changed since a last save to the non-volatile memory 104, the portion need not be re-saved to the non-volatile memory 104. The data save operation 114 may selectively copy one or more of the memory portions 804 of the volatile memory 112 to the non-volatile memory 104 based on whether one or more of the change indicators 806 indicates that one or more of the memory portions 804 have been modified since a most recent data restore operation.

For example, a change indicator value of "1" in the memory portion 810 may indicate that the memory portion 810 has been modified since a most recent data restore operation. Based on the indication that the memory portion 810 has been modified since a most recent data restore operation, the memory portion 810 may be selectively copied from the volatile memory 112 to the non-volatile memory 104 during the data save operation 114. Similarly, a change indicator value of "1" in the memory portion 812 may indicate that the memory portion 812 has been modified since a most recent data restore operation, and based on the indication, the memory portion 812 may be selectively copied from the volatile memory 112 to the non-volatile memory 104 during the data save operation 114. A change indicator value of "0" in one or more of the memory portions 804 may indicate that the one or more memory portions 804 have not been modified since a most recent data restore operation. In that case, the memory portions 804 having a change indicator value of "0" may not be copied from the volatile memory 112 to the non-volatile memory 104 during the data save operation 114.

By selectively copying data that has been modified since a most recent data restore operation from the volatile memory 112 to the non-volatile memory 104 and not copying data that has not been modified since the most recent data restore operation from the volatile memory 112 to the non-volatile memory 104, latency may be improved as compared to copying all the data in the memory image 802 regardless of whether the data has been modified.

Figure 9:
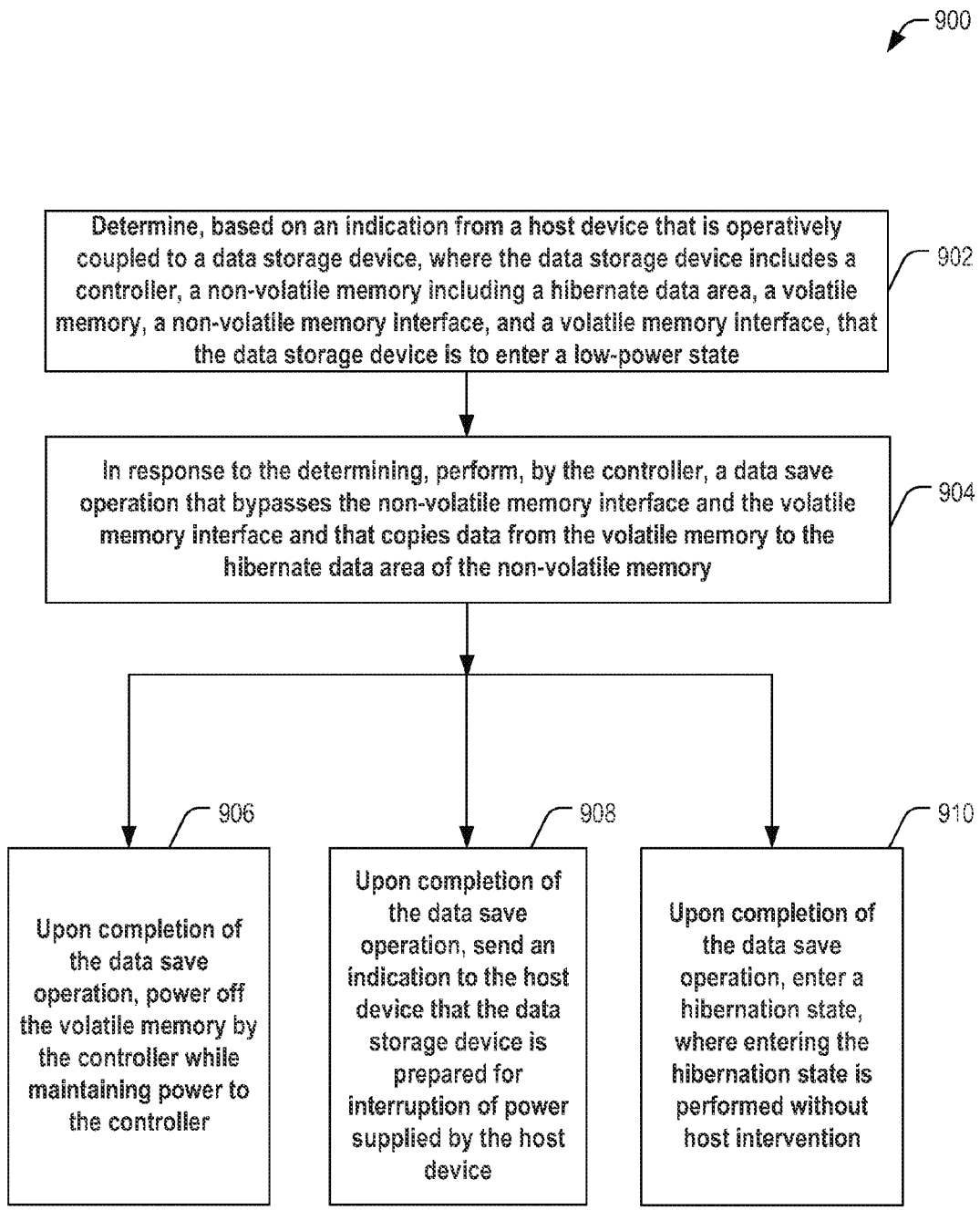
FIG. 9 is a flow diagram illustrating a particular embodiment of a method of performing a data save operation that copies data from a volatile memory to a non-volatile memory of a data storage device.

FIG. 9 depicts a flowchart that illustrates an embodiment of a method 900 of performing a data save operation that copies data from a volatile memory to a non-volatile memory. The method 900 may be performed by a data storage device having a controller, a non-volatile memory including a hibernate area, a volatile memory, a non-volatile memory interface, and a volatile memory interface. For example, the method 900 may be performed by the data storage device 102 of FIG. 1, FIG. 2, and FIG. 3.

A determination is made, based on an indication from a host device, that the data storage device is to enter a low-power state, at 902. To illustrate, the controller 110 may receive one or more of the power event signals 220 from the host device 130. For example, the controller 110 may receive one or more hardware signals, such as the hardware signals 402 of FIG. 4, indicating the sleep state or the power off state. Alternatively, the controller 110 may detect receipt of a hibernation instruction, such as the hibernation instruction 502 from the host device 130 of FIG. 5, indicating the hibernation state. Alternatively, the controller 110 may detect that a timer value exceeds a hibernation threshold, where the timer value indicates an elapsed time since receipt of a most recently received request from the host device to access the volatile memory. For example, a value of the volatile memory inactivity timer 604 of FIG. 6 may be determined to exceed the hibernation threshold 606.

In response to determining that the data storage device is to enter the low-power state, a data save operation that copies data from the volatile memory to the hibernate area of the non-volatile memory is performed by the controller, at 904. Copying the data to the non-volatile memory prevents loss of the data upon interruption of power to the volatile memory. For example, the data save operation may include bypassing the non-volatile memory interface 194 and the volatile memory interface 196 and copying the data 116 from the volatile memory 112 to the controller 110, and writing the data 116 from the controller 110 to the hibernate area 106 of the non-volatile memory 104 via the bus 250. Alternatively, the data save operation 114 may include bypassing the non-volatile memory interface 194 and the volatile memory interface 196 and generating the first bus control signal 314 to cause the hibernate data bus 312 to access the data 116 from the volatile memory 112 and generating the second bus control signal 316 to cause the hibernate data bus 312 to send the data 116 to the hibernate area 106 of the non-volatile memory 104.

Upon completion of the data save operation, the volatile memory may be powered off by the controller while maintaining power to the controller, at 906. For example, the power control circuit 702 may detect that the data save operation 114 has completed. Upon detecting completion of the data save operation 114, the power control circuit 702 may cause the controller 110 to power off the volatile memory 112 while maintaining power to the controller 110.

Alternatively, upon completion of the data save operation, an indication may be sent to the host device that the data storage device is prepared for interruption of power supplied by the host device, at 908. For example, the indication 120 may be sent to the host device 130 that the data storage device 102 is prepared for interruption of power supplied by the host device 130.

Alternatively, upon completion of the data save operation, a hibernation state may be entered, where entering the hibernation state is performed without host intervention or host action, at 910. For example, the data storage device 102 may enter the hibernation state automatically after the data save operation 114.

In implementations where the volatile memory 112 is powered off but the controller 110 remains operational, powering off the volatile memory 112 reduces overall power consumption of the data storage device 102. Performing the data save operation 114 enables the data storage device 102, upon power up, to more quickly revert to a state that the data storage device 102 was in prior to entering the low-power state. The data 116 copied from the volatile memory 112 to the non-volatile memory 104 may be readily available to the host device 130 upon power up and without requiring participation of the host device in the data storage and the data retrieval related to the data save operation 114. In implementations where the host device 130 interrupts power to the data storage device 102, performing the data save operation 114 enables the data storage device to protect data stored at the volatile memory 112 prior to powering off and without requiring participation of the host device in the data storage and the data retrieval related to the data save operation 114.

Figure 10:
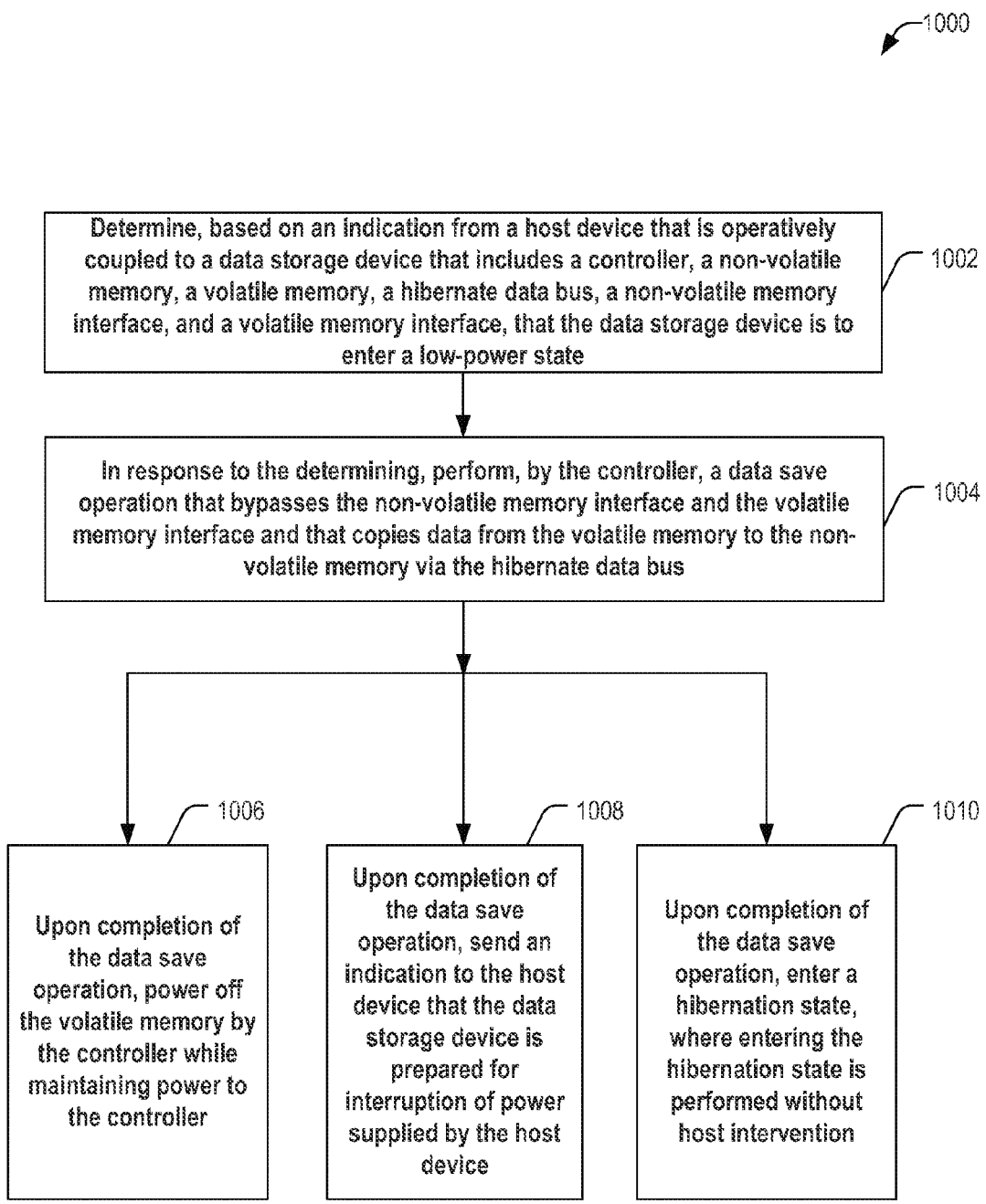
FIG. 10 is a flow diagram illustrating another particular embodiment of a method of performing a data save operation that copies data from a volatile memory to a non-volatile memory of a data storage device.

FIG. 10 depicts a flowchart that illustrates another embodiment of a method 1000 of performing a data save operation that copies data from a volatile memory to a non-volatile memory. The method 1000 may be performed by a data storage device having a controller, a non-volatile memory, a volatile memory, a hibernate data bus that connects the non-volatile memory and the volatile memory, a non-volatile memory interface, and a volatile memory interface. For example, the method 1000 may be performed by the data storage device 102 of FIG. 1 and FIG. 3.

A determination is made, based on an indication from a host device, that the data storage device is to enter a low-power state, at 1002. To illustrate, the controller 110 may receive one or more of the power event signals 220 from the host device 130. For example, the controller 110 may receive one or more hardware signals, such as the hardware signals 402 of FIG. 4, indicating the sleep state or the power off state. Alternatively, the controller 110 may detect receipt of a hibernation instruction, such as the hibernation instruction 502 from the host device 130 of FIG. 5, indicating the hibernation state. Alternatively, the controller 110 may detect that a timer value exceeds a hibernation threshold, where the timer value indicates an elapsed time since receipt of a most recently received request from the host device to access the volatile memory. For example, a value of the volatile memory inactivity timer 604 of FIG. 6 may be determined to exceed the hibernation threshold 606.

In response to determining that the data storage device is to enter the low-power state, a data save operation that copies data from the volatile memory to the non-volatile memory is performed by the controller, at 1004. Copying the data to the non-volatile memory prevents loss of the data upon interruption of power to the volatile memory. For example, the data save operation may include bypassing the non-volatile memory interface 194 and the volatile memory interface 196 and copying the data 116 from the volatile memory 112 to the hibernate area 106 of the non-volatile memory 104 via the hibernate data bus 312 by generating the first bus control signal 314 to cause the hibernate data bus 312 to access the data 116 from the volatile memory 112 and generating the second bus control signal 316 to cause the hibernate data bus 312 to send the data 116 to the hibernate area 106 of the non-volatile memory 104.

Upon completion of the data save operation, the volatile memory may be powered off by the controller while maintaining power to the controller, at 1006. For example, the power control circuit 702 may detect that the data save operation 114 has completed. Upon detecting completion of the data save operation 114, the power control circuit 702 may cause the controller 110 to power off the volatile memory 112 while maintaining power to the controller 110.

Alternatively, upon completion of the data save operation, an indication may be sent to the host device that the data storage device is prepared for interruption of power supplied by the host device, at 1008. For example, the indication 120 may be sent to the host device 130 that the data storage device 102 is prepared for interruption of power supplied by the host device 130.

Alternatively, upon completion of the data save operation, a hibernation state may be entered, where entering the hibernation state is performed without host intervention or host action, at 1010. For example, the data storage device 102 may enter the hibernation state automatically after the data save operation 114.

In implementations where the volatile memory 112 is powered off but the controller 110 remains operational, powering off the volatile memory 112 reduces overall power consumption of the data storage device 102. Performing the data save operation 114 enables the data storage device 102, upon power up, to more quickly revert to a state that the data storage device 102 was in prior to entering the low-power state. The data 116 copied from the volatile memory 112 to the non-volatile memory 104 may be readily available to the host device 130 upon power up and without requiring participation of the host device in the data storage and the data retrieval related to the data save operation 114. In implementations where the host device 130 interrupts power to the data storage device 102, performing the data save operation 114 enables the data storage device 102 to protect data stored at the volatile memory 112 prior to powering off and without requiring participation of the host device 130 in the data storage and the data retrieval related to the data save operation 114.

Figure 11:
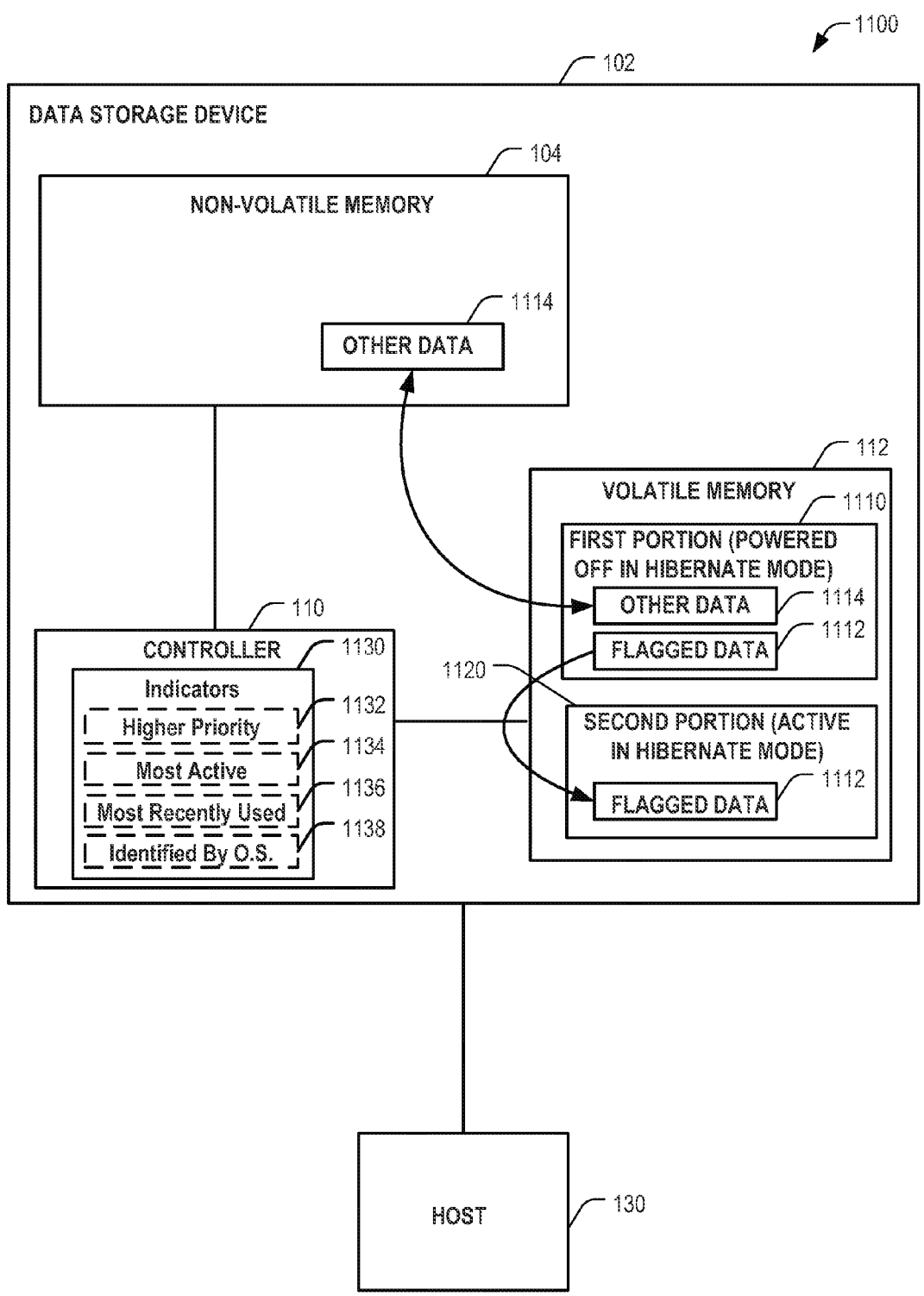
FIG. 11 is a block diagram that illustrates a particular embodiment of a system to perform a data save operation that copies data from a volatile memory to a non-volatile memory of a data storage device.

Referring to FIG. 11, a particular illustrative embodiment of a system to perform a data save operation that copies data from a volatile memory to a non-volatile memory is depicted and generally designated 1100. The system 1100 includes the data storage device 102 coupled to the host device 130. The data storage device 102 includes the non-volatile memory 104, the controller 110, and the volatile memory 112.

The volatile memory 112 includes a first portion 1110 and a second portion 1120. The first portion 1110 of the volatile memory 112 may be powered off in a hibernate mode and the second portion 1120 of the volatile memory 112 may maintain power during the hibernate mode. The first portion 1110 contains data including flagged data 1112 and other data 1114. The flagged data 1112 corresponds to data that is to remain available to the host device 130 at the volatile memory 112 during the hibernation mode. For example, the flagged data 1112 may be data that has been indicated as having a priority that is higher than that of the other data 1114. The other data 1114 corresponds to data that does not remain available to the host device 130 at either the volatile memory 112 or the non-volatile memory 104 during the hibernation mode.

The controller 110 may be configured to receive one or more indicators 1130 that are indicative of a data priority and to flag particular data in the first portion 1110 of the volatile memory 112 according to the one or more indicators 1130. For example, the one or more indicators 1130 may include a higher priority indicator 1132 that indicates particular data having a higher priority than other data. The one or more indicators 1130 may include a most active indicator 1134 that indicates particular data that is most active within the data storage device 102 and having a higher priority than other data. The one or more indicators 1130 may include a most recently used indicator 1136 that indicates particular data that has been most recently used within the data storage device 102 and having a higher priority than other data. The one or more indicators 1130 may include an identified by operating system indicator 1138 that indicates particular data identified by an operating system of the data storage device 102 or of the host device 130 as having a higher priority than other data.

The controller 110 is configured to cause the volatile memory 112 to enter the hibernation mode. For example, the controller 110 is configured to copy, to the second portion 1120, data 1112 that is in the first portion 1110 and that is flagged to remain available to the host device 130 at the volatile memory 112 during the hibernation mode. Copying the flagged data 1112 from the first portion 1110 to the second portion 1120 may prevent loss of the flagged data 1112 due to the first portion 1110 being powered off. The data 1112 may be flagged according to the one or more indicators 1130. The second portion 1120 maintains power during the hibernation mode and the flagged data 1112 remains accessible at the volatile memory 112 to the host device 130 while the volatile memory 112 is in the hibernation mode.

The controller 110 may be configured to copy the other data 1114 in the first portion 1110 to the non-volatile memory 104 prior to powering off the first portion 1110. The other data 1114 may be copied to a secure hibernate area of the non-volatile memory 104 and does not remain available to the host device 130 during the hibernate mode.

During operation, while the data storage device 102 is operatively coupled to the host device 130, the host device 130 may send read requests and/or write requests to access the non-volatile memory 104 and to access the volatile memory 112, and the controller 110 processes the received requests. In response to determining that the data storage device 102 is to enter the hibernation mode, the controller 110 may cause the volatile memory 112 to enter the hibernation mode by copying the flagged data 1112 in the first portion 1110 to the second portion 1120 and by copying the other data 1114 in the first portion 1110 to the non-volatile memory 104. After copying the flagged data 1112 from the first portion 1110 to the second portion 1120 and copying the other data 1114 from the first portion 1110 to the non-volatile memory 104, the controller 110 may power off the first portion 1110 while the second portion 1120 maintains power. The flagged data 1112 that was copied from the first portion 1110 to the second portion 1120 remains available to the host device 130 at the volatile memory 112 during the hibernation mode. The other data 1114 that was copied from the first portion 1110 to the secure hibernate area of the non-volatile memory 104 does not remain available to the host device 130 during the hibernate mode.

After the volatile memory 112 enters the hibernation mode, the controller 110 may be configured to cause the volatile memory 112 to exit the hibernation mode. For example, the controller 110 may cause the volatile memory 112 to exit the hibernation mode by copying the other data 1114 from the non-volatile memory 104 to the volatile memory 112 to restore the other data 1114 to the volatile memory 112. The other data 1114 may be copied from the non-volatile memory 104 to the first portion 1110 of the volatile memory 112. Alternatively, the other data 1114 may be copied from the non-volatile memory 104 to the second portion 1120 of the volatile memory 112.

Powering off a portion of the volatile memory 112 while the controller 110 remains operational reduces overall power consumption of the data storage device 102. For example, by powering off a portion of the volatile memory 112 rather than maintaining power to the entire volatile memory 112, power consumption of the data storage device 102 may be reduced, thereby prolonging a battery life of the host device 130.

Copying the other data 1114 that is stored in the volatile memory 112 to the non-volatile memory 104 prior to powering down a portion of the volatile memory 112 allows the other data 1114 to be maintained in the non-volatile memory 104, thereby enabling the data storage device 102 to more quickly revert to a state that the data storage device 102 was in prior to entering the hibernation mode because the other data 1114 copied from the volatile memory 112 to the non-volatile memory 104 may be readily available to the host device 130 upon exiting the hibernation mode and without requiring participation of the host device 130 in the data storage and the data retrieval.

Figure 12:
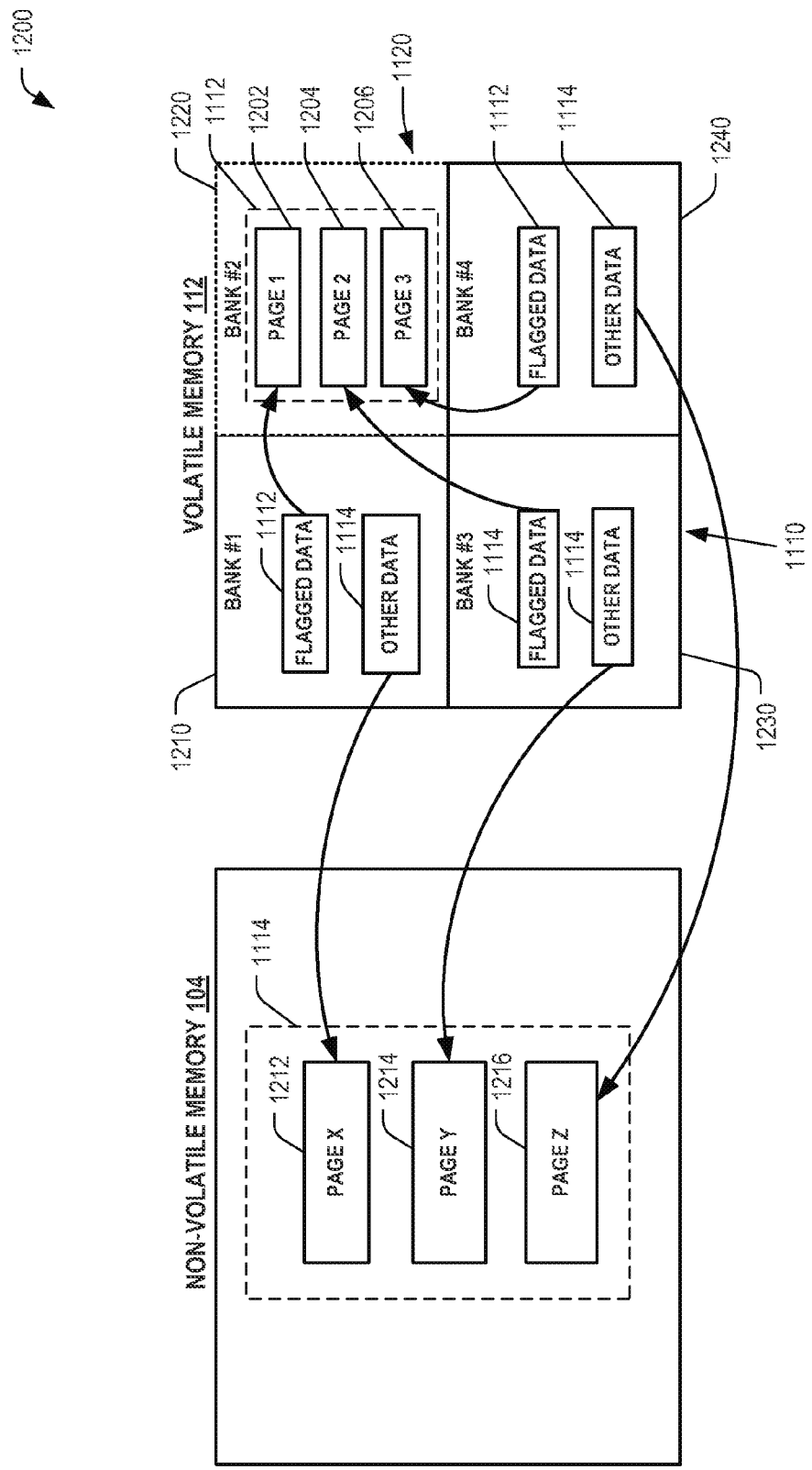
FIG. 12 is a diagram of a second illustrative embodiment of the non-volatile memory and the volatile memory of the system of FIG. 11.

Referring to FIG. 12, a second illustrative embodiment of the system of FIG. 11 is depicted and generally designated 1200. The system 1200 includes the non-volatile memory 104 and the volatile memory 112, and illustrates the first portion 1110 of the volatile memory 112 and the second portion 1120 of the volatile memory 112 of FIG. 11.

The volatile memory 112 includes a plurality of banks to which power can be independently turned on or off, such as a representative first bank 1210, a representative second bank 1220, a representative third bank 1230, and representative fourth bank 1240. Each bank 1210-1240 may be associated with either the first portion 1110 or the second portion 1120. Each bank 1210-1240 may include data, such as the flagged data 1112 and the other data 1114. The flagged data 1112 may include one or more pages, such as representative pages 1202, 1204, and 1206. Similarly, the other data 1114 may include one or more pages, such as representative pages 1212, 1214, and 1216. The flagged data pages 1202-1206 may be indicated by the controller 110 as having a priority that is higher than a priority of the non-flagged data pages 1212-1216. For example, the controller 110 may cause the pages 1202-1206 to be flagged according to the one or more indicators 1130 as being higher priority data, as being most active data, as being most recently used data, or as being provided by an operating system of the data storage device 102 or of the host device 130.

During operation, the controller 110 may cause the volatile memory 112 to enter the hibernation mode. The hibernation mode is entered by copying, to the second portion 1120, the data 1112 that is in the first portion 1110 and that is flagged to remain available at the volatile memory 112 during the hibernation mode, by copying the other data 1114 in the first portion 1110 to the non-volatile memory 104, and by powering off the first portion 1110. The flagged data 1112 may be copied into a particular one of the plurality of banks 1210-1216. To illustrate, the flagged data 1112 in the first bank 1210 may be copied from the first portion 1110 to the second bank 1220 in the second portion 1120. The flagged data 1112 in the third bank 1230 may be copied from the first portion 1110 to the second bank 1220 in the second portion 1120. The flagged data 1112 in the fourth bank 1240 may be copied from the first portion 1110 to the second bank 1220 in the second portion 1120. The flagged data 1112 may include the one or more pages 1202-1206.

The other data 1114 in the first portion 1110 may be copied to the non-volatile memory 104. To illustrate, the other data 1114 in the first bank 1210 (i.e., page "X" 1212) may be copied to the non-volatile memory 104, the other data 1114 in the third bank (i.e., page "Y" 1214) 1230 may be copied to the non-volatile memory 104, and the other data 1114 in the fourth bank (i.e., page "Z" 1216) 1240 may be copied to the non-volatile memory 104.

Figure 13:
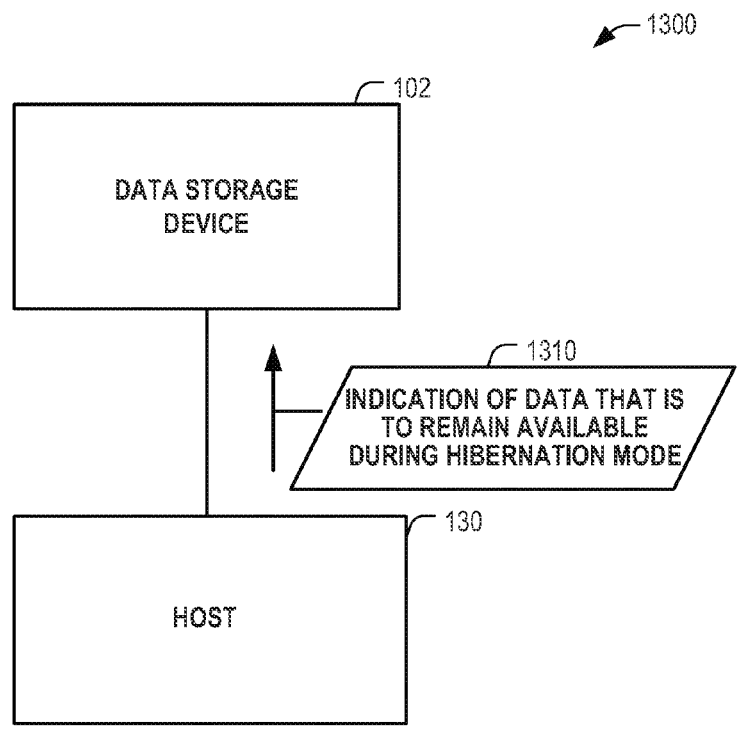
FIG. 13 is a block diagram that illustrates a particular embodiment of receipt of an indication of data that is to remain available at a data storage device during a hibernation mode.

After the flagged data 1112 is copied to the second bank 1220 and the other data 1114 is copied to the non-volatile memory 104, the first portion 1110 may be powered off while maintaining power to the second portion 1120 as described with respect to FIG. 13. In the hibernation mode, the first portion 1110 (i.e., the first bank 1210, the third bank 1230, and the fourth bank 1240) is powered off and the second portion 1120 (i.e., the second bank 1220) remains powered and accessible to the host device 130.

Powering off a portion of the volatile memory 112 while the controller 110 remains operational reduces overall power consumption of the data storage device 102 while enabling the controller 110 and the host device 130 to access the flagged data 1112 at the second portion 1120, thereby enabling the host device 130 to conserve battery power. In addition, a user experience of the host device 130 may be enhanced upon exiting the hibernation mode because the data save operation may enable the data storage device 102 to more quickly revert to a state that the data storage device 102 was in prior to entering the hibernation mode because the other data 1114 copied from the volatile memory 112 to the non-volatile memory 104 may be readily available to the host device 130 upon exiting the hibernation mode and without requiring participation of the host device 130 in the data storage and the data retrieval.

Referring to FIG. 13, a diagram 1300 illustrates receipt, at the data storage device 102, of an indication of data 1310 that is to remain available during a hibernation mode. The indication of data 1310 is received from the host device 130. For example, the controller 110 of FIG. 11 may receive the one or more indicators 1130 from the host device 130 and may cause the data 1112 to be flagged in the first portion 1110 of the volatile memory 112 according to the one or more indicators 1130. The controller 110 may be configured to cause the volatile memory 112 to enter the hibernation mode by copying the flagged data 1112 from the first portion 1110 to the second portion 1120 and powering off the first portion 1110, such as described with respect to FIG. 13.

Figure 14:
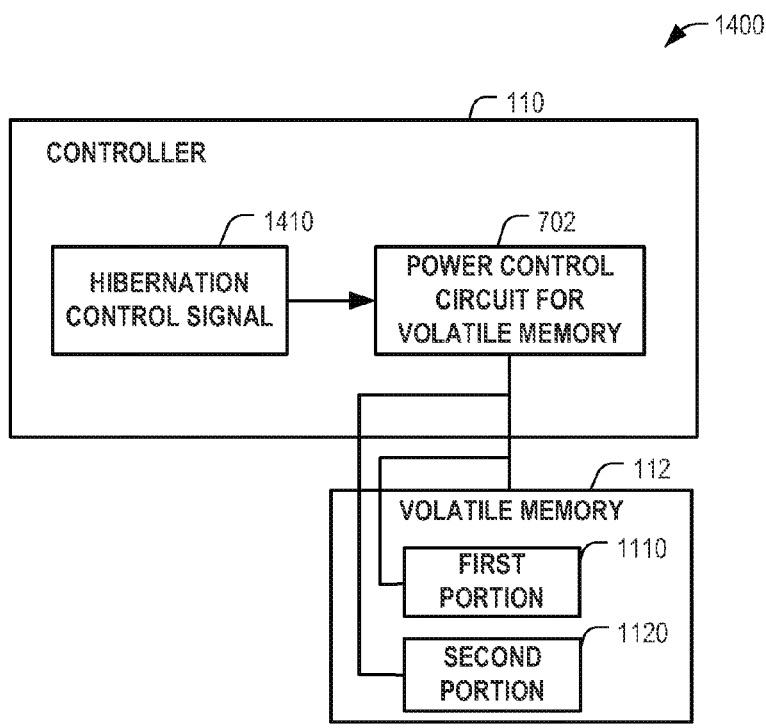
FIG. 14 is a block diagram that illustrates a particular embodiment of the controller of FIG. 11 configured to power off a volatile memory.

Referring to FIG. 14, a diagram 1400 illustrates an embodiment of the controller 110 of FIG. 11 configured to power off the volatile memory 112. The controller 110 may be configured to cause the volatile memory 112 to enter a hibernation mode. For example, the power control circuit 702 of FIG. 7 for the volatile memory 112 may be configured to detect receipt of a hibernation control signal 1410. The hibernation control signal 1410 may indicate that the hibernation mode has been entered, that the flagged data 1112 has been copied from the first portion 1110 to the second portion 1120, and that the other data 1114 has been copied form the first portion 1110 to the non-volatile memory 104. Upon detection of the hibernation control signal 1410, the power control circuit 702 for the volatile memory 112 may cause the controller 110 to interrupt power supplied to the first portion 1110 of the volatile memory 112 while maintaining power to the second portion 1120 of the volatile memory 112. As a result, the controller 110 may power off the first portion 1110 of the volatile memory 1120 while maintaining power to the second portion 1120 of the volatile memory 112 and while maintaining power to the controller 110.

Figure 15:
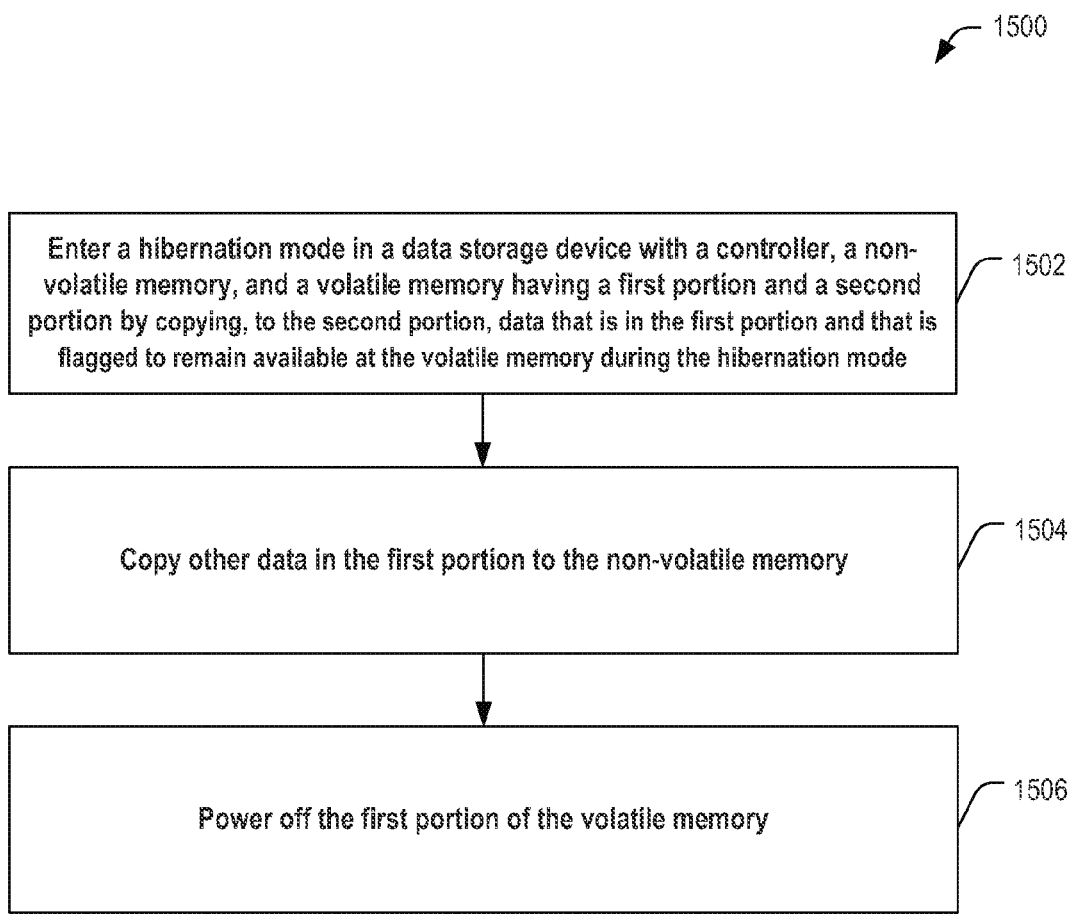
FIG. 15 is a flow diagram illustrating a particular embodiment of a method of performing a data save operation that copies data from a volatile memory to a non-volatile memory of a data storage device.

FIG. 15 depicts a flowchart that illustrates an embodiment of a method 1500 of performing a data save operation that copies data from a volatile memory to a non-volatile memory. The method 1500 may be performed in a data storage device having a controller, a non-volatile memory, and a volatile memory having a first portion and a second portion. For example, the method 1500 may be performed in the data storage device 102 of FIG. 11.

The volatile memory may enter a hibernation mode by copying, to the second portion, data that is in the first portion and that is flagged to remain available at the volatile memory during the hibernation mode, at 1502. For example, the controller 110 of FIG. 11 may be configured to copy the flagged data 1112 from the first portion 1110 of the volatile memory 112 to the second portion 1120 of the volatile memory 112.

Other data in the first portion is copied to the non-volatile memory, at 1504. For example, the other data 1114 of FIG. 11 in the first portion 1110 of the volatile memory 112 may be copied to the non-volatile memory 104.

The first portion may be powered off, at 1506. For example, the power control circuit 702 of FIG. 7 may cause the controller 110 to power off the first portion 1110 of the volatile memory 112 while maintaining power to the second portion 1120 of the volatile memory 112 and while maintaining power to the controller 110.

Powering off a portion of the volatile memory 112 while the controller 110 remains operational reduces overall power consumption of the data storage device 102. Copying the other data 1114 that is stored in the volatile memory 112 to the non-volatile memory 104 prior to powering down a portion of the volatile memory 112 allows the other data 1114 to be maintained in the non-volatile memory 104, thereby enabling the data storage device 102 to quickly revert to a state that the data storage device 102 was in prior to entering the hibernation mode. The other data 1114 may be copied from the volatile memory 112 to the non-volatile memory 104 and may be readily available to the host device 130 upon exiting the hibernation mode and without requiring participation of the host device 130 in the data storage and the data retrieval.

Although various components depicted herein are illustrated as block components and described in general terms, such components may include one or more microprocessors, state machines, or other circuits configured to enable a data storage device, such as the data storage device 102 of FIG. 11, to perform the particular functions attributed to such components, or any combination thereof. For example, the controller 110 of FIG. 11 may represent physical components, such as controllers, processors, state machines, logic circuits, or other structures to cause the data storage device 102 to copy data that is in the first portion 1110 of the volatile memory 112 and that is flagged to remain available at the volatile memory 112 to the second portion 1120 of the volatile memory 112 and to power off the first portion 1110 of the volatile memory 112.

The controller 110 may be implemented using a microprocessor or microcontroller programmed to generate control information and to initiate and perform the copying of data that is in the first portion 1110 of the volatile memory 112 and that is flagged to remain available at the volatile memory 112 to the second portion 1120 of the volatile memory 112 and to power off the first portion 1110 of the volatile memory 112. In a particular embodiment, the controller 110 includes a processor executing instructions that are stored at the non-volatile memory 104. Alternatively, or in addition, executable instructions that are executed by the processor may be stored at a separate memory location that is not part of the non-volatile memory 104, such as at a read-only memory (ROM).

In a particular embodiment, the data storage device 102 may be a portable device configured to be selectively coupled to one or more external devices. For example, the data storage device 102 may be a removable device such as a universal serial bus (USB) flash drive or removable memory card. However, in other embodiments, the data storage device 102 may be attached or embedded within one or more host devices, such as within a housing of a portable communication device. For example, the data storage device 102 may be within a packaged apparatus, such as a wireless telephone, a personal digital assistant (PDA), a gaming device or console, a portable navigation device, a computer, or other device that uses internal non-volatile memory. In a particular embodiment, the data storage device 102 includes a non-volatile memory, such as a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   in a data storage device with a controller, a non-volatile memory, and a volatile memory having a first portion and a second portion, wherein the first portion contains data a part of which is flagged to remain available at the volatile memory while the data storage device is in a hibernation mode, performing:
   detecting an indication that the data storage device is to enter the hibernation mode;
   responsive to the indication, performing:
      copying the flagged data from the first portion to the second portion;
      copying non-flagged data from the first portion to the non-volatile memory;
      powering off the first portion, wherein the second portion maintains power during the hibernation mode; and
   while the data storage device is in the hibernation mode:
      receiving, via a host interface a request from a host device for data located in the second portion; and
      responsive to the re nest sending there requested data to the host device via the host interface.

2. The method of claim 1, wherein the data storage device receives the indication while the data storage device is removably coupled to the host device.

3. The method of claim 1, wherein the flagged data includes data indicated by the controller of the data storage device as having a higher priority than the non-flagged data.

4. The method of claim 1, wherein the flagged data includes data that is indicated by the controller as being most active data.

5. The method of claim 1, wherein the flagged data includes data that is indicated by the controller as being most recently used data.

6. The method of claim 1, wherein the flagged data includes data that is indicated for flagging by an operating system of the host device, wherein the indication is communicated to the controller of the data storage device via the host interface, and wherein the controller of the data storage device flags the indicated data.

7. The method of claim 1, further comprising:
   receiving one or more indicators from the host device; and
   flagging data in the first portion of the volatile memory according to the one or more indicators.

8. The method of claim 1, wherein the controller is configured to:
instruct the volatile memory to copy the flagged data from the first portion to the second portion, wherein the second portion includes a first plurality of memory banks, and wherein the first plurality of memory banks is controllable by the controller to maintain power while the data storage device is in the hibernation mode; and
turn off, while the data storage device is in the hibernation mode, memory banks that are in the volatile memory and are not in the first plurality of memory banks during the hibernation mode.

9. The method of claim 3, wherein the flagged data is flagged, at least in part, based on one of a most active indicator or as indicated by an operating system of the data storage device, and wherein the most active indicator is generated at the controller of the data storage device.

10. The method of claim 1, wherein the volatile memory comprises a plurality of banks, and wherein each of the plurality of banks is associated with one of the first portion and the second portion.

11. The method of claim 10, wherein the flagged data includes one or more pages that are indicated by the controller as having a higher priority than pages of the non-flagged data, wherein the flagged data is copied into one or more of the banks associated with the second portion, and wherein the pages of the non-flagged data are copied to the non-volatile memory.

12. A data storage device comprising:
a non-volatile memory;
a host interface;
a bus distinct from the host interface;
a volatile memory having a first portion and a second portion, wherein the first portion contains data a part of which is flagged to remain available at the volatile memory while the data storage device is in a hibernation mode; and
a controller configured to:
cause the volatile memory to enter the hibernation mode, wherein entry into the hibernation mode includes copying the flagged data from the first portion to the second portion, and wherein entry into the hibernation mode further includes copying non-flagged data in the first portion to the non-volatile memory via the bus and powering off the first portion;
receive, via the host interface while the data storage device is in the hibernation mode, a request from a host device for data located in the second portion; and
responsive to the request and while the data storage device is in the hibernation mode, sending the requested data to the host device via the host interface.

13. The data storage device of claim 12, wherein copying the flagged data from the first portion to the second portion prevents loss of the flagged data due to the first portion being powered off.

14. The data storage device of claim 12, wherein the second portion maintains power while the volatile memory is in the hibernation mode.

15. The data storage device of claim 14, wherein while the volatile memory is in the hibernation mode, the flagged data in the second portion remains accessible to the controller and to the host device.

16. The data storage device of claim 12, wherein the flagged data includes one or more pages that are indicated by the controller as having a higher priority than pages of the non-flagged data.

17. The data storage device of claim 12, wherein the flagged data includes data that is indicated by the controller as being most active data.

18. The data storage device of claim 12, wherein the flagged data includes data that is indicated by the controller as being most recently used data.

19. The data storage device of claim 12, wherein the flagged data includes data that is indicated by the controller as being provided by an operating system of the data storage device or of the host device.

20. The data storage device of claim 12, wherein the controller is configured to receive one or more indicators from the host device and to flag data in the first portion of the volatile memory according to the one or more indicators.

21. The data storage device of claim 12, wherein the controller is configured to instruct the volatile memory to copy the flagged data from the first portion to the second portion.

22. The data storage device of claim 12, wherein the controller is configured to copy the non-flagged data from the non-volatile memory to the volatile memory to restore the non-flagged data to the volatile memory via the bus.

23. The data storage device of claim 12, wherein the volatile memory comprises a plurality of banks, and wherein each of the plurality of banks is associated with one of the first portion and the second portion.

24. The data storage device of claim 23, wherein the flagged data includes one or more pages that are indicated by the controller as having a higher priority than pages of the non-flagged data, wherein the flagged data is copied into one or more banks of the banks associated with the second portion, and wherein the non-flagged data is copied from one or more banks associated with the second portion to the non-volatile memory.

25. The data storage device of claim 12, further comprising:
a volatile memory interface configured to be coupled via a random access memory bus to the host device;
a non-volatile memory interface configured to be coupled via a non-volatile memory bus to the host device; and
wherein copying non-flagged data via the bus includes copying of the non-flagged data from the volatile memory to the non-volatile memory while bypassing the volatile memory interface and bypassing the non-volatile memory interface.

26. The data storage device of claim 25, wherein the bus is coupled to the non-volatile memory, the volatile memory, and the controller.

* * * * *